United States Patent [19]

Das et al.

[11] 4,341,877
[45] Jul. 27, 1982

[54] SIZING COMPOSITION AND SIZED GLASS FIBERS AND PROCESS

[75] Inventors: Balbhadra Das, Allison Park; Billie D. Tucker, Pittsburgh, both of Pa.

[73] Assignee: PPG Industries, Inc., Pittsburgh, Pa.

[21] Appl. No.: 156,459

[22] Filed: Jun. 4, 1980

[51] Int. Cl.$^3$ .............................................. C08L 63/00
[52] U.S. Cl. .................................... 523/409; 428/378; 428/391; 523/402; 523/426
[58] Field of Search ................ 260/29.2 EP, 29.2 TN, 260/29.2 E, 29.6 H, 29.6 NR; 428/391, 392

[56] References Cited

U.S. PATENT DOCUMENTS

| | | | |
|---|---|---|---|
| 3,245,938 | 4/1966 | Dennis | 428/392 |
| 3,437,517 | 4/1969 | Eilerman | 117/126 |
| 3,449,281 | 6/1969 | Sullivan | 260/29.2 |
| 3,459,585 | 8/1969 | Killmeyer | 117/76 |
| 3,827,230 | 8/1974 | Marzocchi | 57/140 G |
| 3,997,306 | 12/1976 | Hedden | 65/3 C |
| 4,049,597 | 9/1977 | Motsinger | 260/18 EP |
| 4,110,094 | 8/1978 | Motsinger | 65/3 C |
| 4,126,729 | 11/1978 | Richardson | 428/389 |
| 4,235,764 | 11/1980 | Dereser | 428/392 |
| 4,241,136 | 12/1980 | Dereser | 428/392 |

FOREIGN PATENT DOCUMENTS

| | | |
|---|---|---|
| 955080 | 4/1960 | United Kingdom . |
| 1136548 | 5/1966 | United Kingdom . |
| 1138528 | 1/1969 | United Kingdom . |
| 1250194 | 10/1971 | United Kingdom . |
| 1253936 | 11/1971 | United Kingdom . |
| 1271500 | 4/1972 | United Kingdom . |
| 1375035 | 11/1974 | United Kingdom . |
| 1550661 | 8/1979 | United Kingdom . |

OTHER PUBLICATIONS

European Patent Application 0000683 Filed July 28, 1978; published Feb. 7, 1979.

*Primary Examiner*—Paul R. Michl
*Attorney, Agent, or Firm*—Kenneth J. Stachel

[57] ABSTRACT

A sizing composition for use in a process of producing sized glass fiber strands that can be used in reinforcing polymers is provided. Also provided are the sized glass fiber strands, glass fiber reinforced polymers and processes for producing these materials. The sizing composition comprises one or more organo silane coupling agents, a major amount of the solids of the aqueous sizing composition is an epoxidized polar thermoplastic copolymer where there are three to about twelve parts of epoxy per 100 parts of the other comonomer and one or more nonionic, cationic or anionic lubricants. The sizing composition can also have one or more compatibilizing agents such as a polyvinyl-acetate-ethylene copolymer unsaturated polyester resins, polyvinylacetate homopolymer, epoxy polymers and epoxy polyester copolymers. The comonomers for the epoxidized polar thermoplastic copolymer are vinyl acetate, acrylates, polyurethane condensate monomer, polyester condensate monomer, and polyamide condensate monomer. The epoxidized polar thermoplastic copolymer has a Tg in the range of ambient temperatures to about 70° C. The glass fiber strands treated with this sizing composition can be made into roving for use in producing glass fiber reinforced polymers like polyester polymers, vinyl ester polymers and epoxy polymers.

19 Claims, No Drawings

SIZING COMPOSITION AND SIZED GLASS FIBERS AND PROCESS

The present invention is directed to a sizing composition for treating glass fibers in a process to produce treated glass fiber strands that have improved properties of wettability and compatibility in polymer matrices to produce reinforced polymers with improved mechanical and fatigue properties. The present invention is particularly directed to a sizing composition for treating glass fibers in a process to produce treated glass fiber strand having improved wettabilty and compatibility when used in unsaturated polyester or vinyl ester or epoxy matrices for producing high glass content reinforced polyester materials.

It is well known in the art to use glass fibers in the form of chopped fibers, continuous strand, woven materials and mats to reinforce polymeric materials. Glass fibers used to reinforce polymeric materials are produced by drawing the fibers at a high rate of speed from molten glass contained in tips of small orifices in a platinum device called a bushing. The glass fibers so produced must be protected from interfilament abrasion during formation and further processing and must be made compatible with the polymeric materials they are to reinforce. In order to accomplish this a sizing composition is used to treat the glass fibers during formation. The sizing composition conventionally contains lubricants, film formers, coupling agents, wetting agents, emulsifiers and the like. After the glass fibers are treated with the sizing composition they are gathered into one or more strands and wound into a package. These packages are usually dried and then a plurality of these dried packages are mounted on a roving ball. The ends of such a roving ball can be threaded into a chopper of a sheet molding compound machine to produce thermosettable polymers reinforced with the glass fibers in the form of a sheet material. An example of a sizing composition that has been useful in producing sized glass fiber strands for use in reinforced polymeric materials is the composition having an organo silane coupling agent, polyvinylacetate homopolymer, polyvinylacetate ethylene copolymer and a lubricant.

Of more recent interest to the art has been the manufacture of high strength glass fiber reinforced polymeric materials. These high strength reinforced polymeric materials have a glass fiber content of greater than 50 percent of the composite as opposed to the sheet molding compounds which have around 30 percent glass fibers. These composites are materials with several distinct phases usually consisting of a reinforcing phase such as fibers and a supporting phase such as a matrix resin or polymer. The major load carrying member of a high modulus composite is the reinforcing phase. The matrix phase serves as a load splicing medium around the reinforcing phase. In the high strength or high modulus composites these materials are fabricated using high concentrations of fibers approximately over 50 percent in matrices where maximum bond strength between fiber and matrix resin is insured. Two families of high strength glass fiber reinforced molding composites that have been recently introduced into the market place are the XMC ® composite and the HMC ® composite available from PPG Industries, Inc., Pittsburgh, Pennsylvania 15222. Both of these composites have high strength properties needed for structural uses. The HMC ® composite offers isotropic strength properties approaching twice those of conventional sheet molding compounds by employing high glass fiber content with little or no filler. The XMC ® composite is a directionally reinforced, multiple resin-glass fiber sheet containing 65 percent to 75 percent continuous reinforcement.

The production of the high modulus or high strength glass fiber reinforced polymeric materials placed increased demands on the sizing composition used to treat the glass fibers that are to be used in these composites, because of the higher amounts of glass fibers used in the composites. It is desirable to have a high degree of wet-through in the high modulus or high strength composites in order that the final physical properties of the composites and the processability of the composites are at their maximum levels. Also the association of the glass fibers with the matrix resin usually referred to as "wet-out" during compounding means that the resin encapsulates the glass fibers and very little, if any, bare glass is visible throughout the molded polymeric compound. Wet-out during compounding is a measure of the apparent intimacy of contact between the polymeric matrix and the glass fibers. If the glass fibers are not intimately wet-out following compounding with the polymeric material, it is expected that they will wet-out on aging due to the increase of the viscosity of the compound. This may lead to adverse effects on the processability, molding characteristics and surface properties of the final molded polymeric material. Also the sizing composition must have the proper solubility in the matrix resins and polymers to make the molded glass fiber reinforced polymeric material. For example, a myriad of applications of thermosetting molding composites utilize unsaturated polyesters or vinyl ester or epoxy resins and the solubility of the sized glass fibers and the ethylenically unsaturated organic solvents can affect the final properties of the molded polymeric product. Also, it is essential that the sizing composition produce sized glass fiber strands that are protected during processing of these high strength glass fiber reinforced molding composites.

In the production of these materials the sized glass fiber strands at some point are removed from packages and passed through eyelets and guide eyes to a guiding operation or chopped in a chopping operation or woven or formed into a mat. It is important that the glass fibers do not disintegrate into dangling strands and tangled strands. All of the aforementioned properties of sized glass fiber strands are important in the formation of glass fiber reinforced high strength polymers but these properties can be useful in the conventional sheet molding compounds and bulk molding compounds.

It is an object of the present invention to provide a sizing composition and process for producing same for treating glass fibers to produce the glass fibers and strands having improved wettability such as "wet-through" and "wet-out" and having substantial solubility in matrix resins and polymers to provide some degree of filamentization and having good processability.

It is an additional object of the present invention to provide high strength glass fiber reinforced unsaturated polyester, vinyl ester or epoxy resin composites having improved mechanical properties because of the use of glass fiber reinforcement having the dried residue of an improved sizing composition.

It is a further additional object of the present invention to provide treated glass fiber strands having improved properties of wettability, and solubility, in matrix resins and polymers and having improved processability in producing glass fiber reinforced polymeric materials.

SUMMARY OF THE INVENTION

The foregoing objects and other objects inherently taught from the following disclosure are achieved by having an aqueous sizing composition for glass fibers and that is substantially soluble in polymeric materials that the glass fibers are to reinforce comprising: a predominant amount of the solids of the composition being an epoxidized polar thermoplastic copolymer, one or more organo silane coupling agents, and one or more lubricants.

The epoxy polar thermoplastic copolymer has a glass transition temperature (Tg) as determined by nuclear magnetic resonance peak ratio or approximated by less complicated techniques such as differential thermal analysis in the range of ambient temperature at which the glass fiber strands are used to about 70° C. Typically ambient temperature is above about 18° C. The predominant amount can range from 3 to about 20 weight percent of the aqueous sizing composition. The epoxidized copolymer has about 3 to about 12 parts of epoxy per 100 parts of the other non-epoxy monomer. The non-epoxy monomer or condensate is selected from vinyl acetate, acrylates, polyurethane condensate monomer, polyester condensate monomer, and polyamide condensate monomer.

The sizing composition does not require any other additives other than water and the aforementioned materials to accomplish the aforementioned objects of the invention although other additives such as compatibilizing agents, antistatic agents and processing aids and the like may be used. Compatibilizing agents are polymeric materials that have the capability of forming chemical, physical chemical, or mechanical bonds to at least a minor degree with the matrix polymer that the sized glass fibers having the polymeric material in the size are to reinforce. Example of these compatibilizing agents include ethylene-vinyl acetate copolymer, unsaturated polyester resin, epoxy polyester copolymer and epoxy homopolymers. When such compatibilizing agents are used, one or more of them are used in an amount of less than about 20 weight percent of the total amount of film former in the sizing composition. This is in order to assure the proper solubility of the sized glass fiber strands in the polymer matrix.

The sized glass fibers are produced by a process involving drawing glass fibers from molten cones of glass at a high rate of speed, applying to the fibers during formation the aqueous glass fiber sizing composition comprising organo silane coupling agent, epoxidized polar thermoplastic copolymer and lubricant and water, and gathering the fibers into one or more strands and winding the strands on a rapidly rotating forming tube.

Sized glass fiber strands on forming tubes are dried and a plurality of the forming tubes are manufactured into a roving and the glass fiber strands are collected on a rotating spindle to form a rotating ball. The glass fiber strands in any form such as individual strand from forming tubes, roving, chopped strand, mat or woven strands can be used to reinforce polymeric materials, such as unsaturated polyesters, vinylesters and epoxy polymers. These reinforced polymers can be produced as sheet molding compounds, bulk molding compounds and high modulus molding composites such as HMC ® composites and XMC ® composites.

DETAILED DESCRIPTION OF THE INVENTION

In composites of glass fiber reinforced polymers produced from sheet molding compounds, bulk molding compounds and high modulus molding compounds, the relationship between the reinforcement phase, glass fibers, and the supporting phase, polymer matrix, governs many of the mechanical properties of the final composite. For example, flexural modulus and flexural strength of the composites, as defined by the American Society of Testing Materials (ASTM) test D-790 are believed to reflect upon the degrees of adhesion between the reinforcing and supporting phases of the composite. Other mechanical properties that are affected are inplain shear strength, measured according to ASTM Test D3846-79, which is a true measure of bonding between fibers and matrix resin; Izod impact resistance, dynamic hysteresis and fatigue resistance. Care must be taken in trying to increase any one particular mechanical property of the composite in relationship to the other mechanical properties of the composite so that by increasing one property the other properties are not detrimentally affected.

The sizing composition of the present invention gives sized glass fiber strands with improved wettability and solubility in the matrix polymer to produce molding compounds that are made into molded composites that have improved mechanical properties of Izod impact resistance, in-plane shear and flexural strength without detrimentally affecting other mechanical properties. The sizing composition of the present invention is one that is substantially soluble in the polymeric matrix that the sized glass fiber strands are to reinforce. By "substantially soluble," it is meant that solubility of the sizing composition in the polymeric matrix is greater than 50 percent and preferably about 60 to above 70 percent. This solubility is approximated by the solubility of the sizing composition in organic solvents that simulate the chemical nature of the matrix polymer. Nonexclusive examples of these solvents include acetone, toluene, or styrene.

It is believed, but the present invention is not limited by this belief, that the substantially soluble sizing composition allows the sized glass fiber strands to filamentize in the presence of the matrix polymer. This is especially useful in the high modulus glass fiber reinforced polymeric composites and in sheet molding compounds that are pigmentable.

The epoxidized polar thermoplastic copolymer is present in the sizing composition in an amount of 3 to about 20 weight percent of the aqueous sizing composition or about 10 to about 90 weight percent of the nonaqueous components of the composition. The copolymer is present always as the major constitutent other than water in the sizing composition. This amount is important in order to get improved wet-out and solubility of the sized glass fiber strands and improved mechanical properties of the glass fiber reinforced polymeric composites.

As mentioned above, the copolymer can be epoxidized polyvinylacetate, epoxidized polyacrylate, including various acrylates, which are esters of acrylic or methacrylic acid, like methyl methacrylate, methyl acrylate, ethyl methacrylate, 2-ethylhexyl acrylate, butylacrylate and the like; epoxidized polyesters; epoxidized polyamides; and epoxidized polyurethanes, like thermoplastic aliphatic and aromatic polyurethanes prepared from condensation polymerization of an aliphatic or aromatic diisocyanate and diol. The copolymer has a Tg ranging from ambient temperature to about 70° C. and can be formed by emulsion or suspension polymerization and may contain small amounts of various polymerization additives like stabilizers and surfactants. The copolymers can exist in aqueous emulsions having varying amounts of solids. In the copolymer the amount of epoxy functionality is in the range of about 3 to about 12 parts per 100 parts of the other copolymer. If there are less than three parts, the copolymer will not be sticky enough to give good ribbonization. If there are more than 12 parts epoxy, the copolymer will be too sticky for processing.

The sizing composition of the present invention preferably has the epoxidized polyvinylacetate copolymer as the predominant film-former in the sizing composition, when the sized glass fibers are to reinforce unsaturated polyesters, vinyl esters, or epoxy polymers. The type of copolymer and the amounts of the monomers in the sizing composition have already been stated and examples of the type of copolymer include the product designated "Resyn 25-1971" available from National Starch, Bridgewater, New Jersey. This copolymer has 3 percent epoxy functionality in the epoxidized polyvinylacetate copolymer. Another material that has been found suitable is that designated "Resyn NSR 3362-53" which is available from National Starch, Bridgewater, New Jersey and has 7 percent epoxy functionality in the epoxidized polyvinylacetate copolymer. Another epoxidized polyvinylacetate copolymer that has been found to be useful is that material available from H. B. Fuller Company under the trade designation "PN-3013".

The one or more organo-functional silane coupling agents used in the sizing composition of the present invention can be those having a reactive moiety on the compound, which is free-radically polymerizable such as acrylate, methacrylate, alkyl, vinyl or the like. A particularly advantageous organo-silane coupling agent is gamma-methacryloxypropyltriethoxysilane available from Union Carbide Corporation under the trade designation "A-174." However, other unsaturated coupling agents such as vinyl triethoxysilane vinyltrimethoxysilane and the like may be utilized as the organosilane coupling agent. In addition to the silane coupling agent with the free-radically polymerizable moiety, an amino-functional silane coupling agent having the general formula:

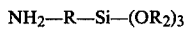

NH$_2$—R—Si—(OR$_2$)$_3$ can be used. The R group is an alkylene radical having from two to eight carbon atoms and the R group is a lower alkyl radical or hydrogen. This lower alkyl radical has one to five carbon atoms and preferably one or two carbon atoms. The amount of each organosilane coupling agent present in the sizing composition is in the range of about 0.1 to about 5 percent by weight based on the total weight of the aqueous sizing composition or up to 20 weight percent of the solids in the sizing composition for the one or more silane coupling agents. When the combination of the silane with the free radical reactive moiety and the amino-functional silane is used, it is preferred that the silane with the free radical reactive moiety be used in a greater amount than the amino-functional silane.

The one or more lubricants that are used in the sizing composition are cationic, nonionic, or anionic lubricants. Nonexclusive examples include cationic lubricants that are typically an amine salt of a fatty acid which has 4 to 26 carbon atoms and in all cases an even number of carbon atoms per molecule or alkyl imidazoline derivatives such as described in U.S. Pat. Nos. 2,200,815; 2,267,965; 2,268,273 and 2,355,837 which are hereby incorporated by reference. In the fatty acid amine salt lubricant the fatty acid moiety of the salt has between 12 and 22 carbon atoms. The amines useful for forming the salt are tertiary amines of substantially low molecular weight, i.e., the alkyl groups attached to the nitrogen atom should be between 1 and 6 carbon atoms. Examples of such an amine salt of a fatty acid lubricant are the Emerylube products available from Emery Industries, Inc. These include the products designated "6717," "4046D" and "6760." The latter product is preferred for use as the sole lubricant, since it is a neutralized material having approximately a 50 percent solids content. A non-exclusive example of the alkylimidazoline derivative is the product designated "Cation X," which is the reaction product of stearic acid, tetraethylene pentamine and acetic acid. The acid solubilized water dispersible stearic amides and anhydrous acid solubilized water dispersible lower molecular weight fatty acid amides as well as anhydrous acid solubilized polyunsaturated lower molecular weight fatty acid amides can also be used. These lubricants aid in the processing of the glass fiber strands and the roving formed therefrom by imparting slip to the exterior of the strand or roving as it passes over various types of processing equipment. Each lubricant is used in an amount from about 0.5 to about 2 percent by weight and preferably from about 0.75 to about 1.5 percent by weight based on the ingredients of the aqueous sizing composition.

The compatibilizing agent useful in the sizing composition of the present invention are preferably the unsaturated polyesters formed from unsaturated polycarboxylic acids or anhydrides such as maleic, and fumaric carboxylic acids or the like and a polyhydric alcohol. Other unsaturated carboxylic acids that may be used in producing the unsaturated polyester resin include, for example, chloromaleic acid or anhydride, tetrahydrophthalic acid or anhydride and the like. The polyhydric alcohols useful in preparing the unsaturated polyester resin are the dihydric alcohols such as propylene glycol, dipropylene glycol, diethylene glycol, 1,3-tetramethyleneglycol and the like, the trihydric alcohol such as trimethylolpropane, trimethylolethane, glycerol and the like and the tetraols such as pentaerythritol and the like. Preferably the condensation polymers have a molecular weight of about 500 to 5,000 and preferably have an acid number of less than 100 and more preferably less than 70.

Another compatibilizing agent that can be used is a polyvinylacetate homopolymer or vinyl acetate-ethylene copolymer. A particularly useful vinyl acetate-ethylene copolymer is available from Airco Chemicals and Plastics Company under the trade designation "AIRCOFLEX-X-510," although any of the AIRCOFLEX 400 copolymers may be used. A particularly useful polyvinylacetate homopolymer that can be used is the product available from National Starch under the trade designation "Resyn NS 78-3724" which also has a small amount of an organo silane coupling agent with a free radically polymerizable reactive moiety (A-174) blended with the homopolymer.

Other compatibilizing agents that can be used include epoxy polymers and epoxy polyester copolymers. The epoxy polymer can be aromatic epoxy polymers formed by reacting epihalohydrin with bisphenol A and other phenolic epoxies. The phenolic epoxies are obtained by the reaction of a stochiometric excess of an epihalohydrin with polyhydric phenol. Typically the molecular weights range between 300 and 400. Other epoxies resins that can be used are the peracetic acid based cycloaliphatic epoxy or the polyglycidyl ethers of a Novalac resin. Also epoxy polyester copolymers can be used. An example is the reaction product of a partial ester of a polycarboxylic acid, which contains one or more esterified carboxyl groups with a compound containing more than one epoxy group formed by reactions known to those skilled in the art. Such reaction products are recited in U.S. Pat. No. 3,437,517 hereby incorporated by reference.

The amount of one or more compatibilizing agents used in the aqueous sizing composition must be less than 20 weight percent of the epoxidized polar thermoplastic copolymer film-former. If an amount over 20 weight percent is used, the sizing composition may not produce the desired solubility of the sized glass fiber strand in the polymer matrix.

When the compatibilizing agent is an unsaturated polyester resin or vinylester or polyvinyl-acetate resin, it may be necessary to use a small amount of anti-static agent such as ammonium chloride in the sizing composition.

In preparing the sizing composition it is desirable that the solids be between about 2 and about 30 percent by weight and preferably between about 18 and about 25 percent by weight of the aqueous sizing composition. The pH of the sizing composition should be controlled between about 5 and 7 and preferably between 5.2 and 6.2. The sizing composition is applied to fibers by any conventional method to obtain a solids application of 0.5 to about 2 percent by weight based on the total weight of the fibers and sizing composition and more preferably between about 0.5 and about 1 percent by weight. The sized glass fibers are then gathered into one or more strands and wound onto a forming package by any conventional method. The forming packages are then dried in an oven usually at a temperature around 100° to 133° C. for about 5 to 15 hours. A plurality of the forming packages are then mounted on a creel, braided into roving and collected onto a rotating spindle to form a roving ball. The ends of a plurality of a roving ball are threaded into machinery to produce sheet molding compound, bulk molding compound and high modulus molding compound such as HMC ® composites and XMC ® composites.

In the preferred embodiment of the present invention the sizing composition has a high solids concentration in the range of about 18 to about 20 weight percent and is prepared in the following manner with the following components. In the preferred embodiment the vinyl containing organo silane coupling agent is gammamethacryloxypropyltriethoxysilane (A-174) used in an amount of about 0.4 to about 2.5 weight percent of the sizing composition. The amount of A-174 silane is preferably added with agitation to a small amount of acetic acid around 1 to 10 weight percent of the silane in a main mix tank. The epoxidized polyvinylacetate copolymer is preferably the National Starch material (Resyn NS 25-1971) with three parts of epoxy for 100 parts of vinyl acetate used in amount to about 5 to about 16 weight percent of the aqueous sizing composition. The epoxidized copolymer is combined with an amount of 0.05 to about 2.0 weight percent of unhydrolyzed, although partially hydrolyzed could also be used, aminofunctional organo-silane (gamma-aminopropyltriethoxysilane, A-1100 from Union Carbide Corporation) in a first premix vessel. Also, it is preferred to use the amidated polyamine lubricant available from Emery Industries, Inc., Cincinnati, Ohio under the trade designation Emerylube 6760. It is preferred to use the Emerylube material in amount of about 0.05 to about 1 weight percent of the aqueous sizing composition. The lubricant is diluted in hot water in a second premix tank. Also, it is preferred to use a compatibilizing agent which is polyvinylacetate-ethylene copolymer available from Air Products under the trade designation AIRCO-FLEX-X-510 in an amount of about 0.5 to about 5.0 weight percent of the aqueous sizing composition. The vinyl acetate-ethylene copolymer is added to the main mix tank with agitation. After this addition, the mixture of amino-organosilane and epoxidized polyvinylacetate copolymer is added with agitation to the main mix tank. Also the diluted lubricant mixture is added to the main mix tank. The resultant mixture is diluted to the desired volume and the pH is adjusted to about 4.5 to about 5.5. It is preferred to use acetic acid although any organic or inorganic acid can be used to adjust the pH of the sizing composition.

In the foregoing description of the preferred embodiment the amounts of the ingredients are in weight percentages of the total aqueous sizing composition.

It is preferred to use the sizing composition with a solids content in range of about 18 to about 20 weight percent to treat the glass fibers from a roll type applicator as they are being formed. After the treated glass fibers are gathered into one or more strands and wound into a forming package, it is preferred to dry a plurality of the forming packages in an oven at 133° C. for 11 hours.

It is also preferred to use a plurality of the dried forming packages to produce a roving by mounting the forming packages on a creel and braiding the strands into a roving and then collecting the roving on a rotating spindle to form a roving ball. The roving ball can then be used by threading the ends of the roving into a chopper of a sheet molding compound machine or it can be used in the production of high modulus molding composites like HMC ® composite and XMC ® composites. These composites can be produced in accordance with the teachings of the article entitled "XMC$^{TM}$ and HMC$^{TM}$ Structural Molding Compounds," Society of Automotive Engineers, Inc., Paper No. 760053, Richard H. Ackley, 1976, and PPG Industries Fiber Glass Division Technical Service Bulletin TS-201A, entitled "HMC ® High Strength Molding Composites New Formulations, Processing and Molding," both of which are hereby incorporated by reference.

The following examples will further elucidate the concept of the invention.

EXAMPLE I

Ten gallons of a sizing composition were prepared by adding 19 ml of acetic acid to a main mixed tank. To this main mix tank there was added 293 grams (0.7 weight percent of gamma methacryloxypropyltriethoxy silane. Agitation was provided and continued for ten minutes or until this solution is complete. An amount of 7,108 grams (8.5 weight percent) of epoxidized polyvinylacetate copolymer (Resyn S-25-1971) was added to the main mix tank. After this addition an amount of 141 grams (0.3 weight percent) of cationic fatty acid amide sold by Emery Industries (Emery 4046D) was added to hot water in a premix vessel with agitation. Agitation was continued until the solution was complete and this solution was added to the main mix tank. Acidic acid was then added to the main mixed tank to bring the pH to 5.8±0.3 and the resultant mixture was diluted to ten gallons (37.85 liters) and agitated for five minutes.

EXAMPLE II

Ten gallons (37.85 liters) of a sizing composition were prepared by combining 1.5 gallons of water (5.68 liters) with 292 grams of A-174 silane (0.7 weight percent) and 19.3 ml of acetic acid. The combination was performed in a premix vessel with agitation until the solution was complete. The silane solution was then conveyed to a main mix tank. To this mix tank there was added 7,107.8 grams (8.4 weight percent) of epoxidized polyvinylacetate copolymer (Reysin 25-1971) with agitation. Next, an amount of 941.2 grams (1.1 weight percent) of polyvinyl acetate-ethylene copolymer (AIRCOFLEX X-510) was added to the main mix tank. Hot water in an amount 1,134 grams (2.7 weight percent) and 140.6 grams (0.3 weight percent) of cationic fatty acid amide (Emery 4046 D) were combined with agitation in a pre-mix tank. The agitation was continued until the solution was complete and then the solution was added to the main mix tank. An amount of acetic acid was added to bring the pH to 5.8±0.3 and the resultant mixture was diluted to 10 gallons.

This produced a sizing composition having 12.6±0.2% solids which was the same as that in Example I.

EXAMPLE III

Fifteen gallons (56.8 liters) of a sizing composition were prepared by combining 438 grams (0.7 weight percent) of the A-174 silane with 29 ml acetic acid in a premix vessel with agitation. The agitation was continued until the solution was complete, at which time the solution was transferred to a main mix tank. To the main mix tank there was added 10,662 grams (8.4 weight percent) of epoxidized polyvinylacetate copolymer (Resyn NSR 3362-53, 7% epoxy). After this addition an amount of 1,412 grams (1.1 weight percent) of polyvinylacetate-ethylene copolymer (AIRCOFLEX X 510) was added to the main mix tank. Cationic fatty acid amide lubricant (Emerylube 4046 D) in an amount of 212 grams (0.3 weight percent) was combined with hot water under agitation. The agitation continued until the solution was complete, at which time a solution was added to the main mix tank. The acetic acid was added to bring the pH to 5.8±0.3. The resultant mixture in the main mix tank was diluted to the final volume.

The sizing composition had a percent solids of 12.6±0.2.

EXAMPLE IV

A sizing composition similar to the sizing composition of Example III was prepared in the same manner except instead of the epoxidized polyvinylacetate copolymer, Resyn NSR 3362-53, there was used the epoxidized polyvinylacetate copolymer, Resyn NS 25-1971 in the same amount.

EXAMPLE V

A sizing composition in an amount of 10 gallons (37.85 liters) was prepared by combining 330.7 grams (0.9 weight percent) of the A-174 silane with 20 ml of acetic acid in a pre-mix vessel with agitation. The agitation was continued until the solution was complete. An amount of amidated polyamine lubricant (Emery 6760, 160.3 grams) of 0.2 weight percent was diluted in hot water and adjusted to a pH of 4.5 to 5.0 in a second premix tank. An amount of epoxidized polyvinylacetate copolymer of 8,000 grams (11.3 weight percent) and an amount of 1,066.4 grams (1.5 weight percent) of the vinyl acetate-ethylene copolymer (AIRCOFLEX-X-510) were diluted in water and the pH adjusted to 4.5–5.0 in a main mix tank. The adjusted A-174 silane and the diluted polyamine lubricant were added to the main mix tank as was 15.3 grams (0.04 weight percent) of gamma-aminopropyltriethoxy silane (A-1100) and the mixture was diluted to 10 gallons. With the pH was 5.5±0.2 and the percent solids was 14.0±0.3.

EXAMPLE VI

An amount of 30 gallons ($1.13 \times 10^2$ liters) of a sizing composition was prepared. The method of preparation was the same as Example V and the formulation is as shown below:

| | | |
|---|---|---|
| 1. A-174 | 992.1 grams | 0.92 weight percent |
| 2. Epoxidized polyvinyl acetate copolymer (RESYN NS25-1971) | 24,000 grams | 11.2 weight percent |
| 3. Vinyl acetate ethylene copolymer (AIRCOFLEX X-510) | 3,199.2 grams | 1.5 weight percent |
| 4. Emery 6760 lubricant | 480.9 grams | 0.22 weight percent |
| 5. Gamma amino propyl triethoxy silane (A-1100) | 195.6 grams | 0.18 weight percent |

The pH of the sizing composition was 5.0±0.3 with a solids content of 14.0±0.3.

EXAMPLE VII

An amount of 30 gallons ($1.13 \times 10^2$ 113 liters) of a sizing composition was prepared in the same manner as that of Example V. The sizing composition had the following formulation.

| | | |
|---|---|---|
| 1. A-174 | 992.1 grams | 0.92 weight percent |
| 2. RESYN NS25-1971 | 24,000 grams | 11.1 weight percent |
| 3. AIRCOFLEX X510 copolymer | 3,199.2 grams | 1.5 weight percent |
| 4. Emery 6760 lubricant | 961.8 grams | .345 weight percent |

The sizing composition had a pH of 5.0 ± 0.3 and a solids content of 14.0 ± 0.3.

EXAMPLE VIII

An amount of 10 gallons (37.850 liters) of a sizing composition was prepared in the following manner. An amount of A-174 silane of 330.7 grams (9.3 weight percent) was added to acetic acid for 20 to 30 minutes to be hydrolyzed. An amount of 30.6 grams (0.08 weight percent) of A-1100 was hydrolyzed with acetic acid for 20 to 30 minutes and adjusted to a pH of 4.5 to 5.0 in a second pre-mix tank. An amount of 160.3 grams (0.2 weight percent) of Emery 6760 lubricant was diluted in hot water and adjusted to a pH of 4.5 to 5.0 in a third pre-mix tank. An amount of 8,000 grams (11.2 weight percent) of epoxidized polyvinyl acetate copolymer available from Fuller Chemical Company under the trade designation Fuller PN 3013 was diluted in water along with 1,066.4 grams (1.5 weight percent) of vinyl acetate-ethylene copolymer (AIRCOFLEX X-510) in a main mix tank. To the main mix tank there was added the hydrolyzed A174 and hydrolyzed A-1100. Then to the main mix tank there was added the diluted Emery lube lubricant and the resulting solution was diluted to 10 gallons and the pH adjusted to 5.0±0.3. The percent solids of the sizing composition was 14.0±0.3.

EXAMPLE IX

Ten gallons (37.850 liters) of a sizing composition was prepared. The sizing composition had the following formulation:

| | | | |
|---|---|---|---|
| 1. A-174 | 330.7 grams | 0.88 | weight percent |
| 2. RESYN NS25-1971 | 4,000 grams | 5.4 | weight percent |
| 3. RESYN NS78-1724 | 4,000 grams | 5.9 | weight percent |
| 4. Vinyl acetate ethylene copolymer (AIRCOFLEX X510) | 1,066.4 grams | 1.4 | weight percent |
| 5. Emery 6760 lubricant | 160.3 grams | 0.2 | weight percent |
| 6. A-1100 | 65.2 grams | 0.17 | weight percent |

This sizing composition was prepared by the same manner as that of Example VIII, except the polyvinylacetate material, Resyn NS 78-3724, was combined with the epoxidized polyvinylacetate copolymer, Fuller 3013, and the vinylacetate-ethylene copolymer. To this mixture there was added the hydrolyzed silanes and diluted lubricant.

The sizing composition had a pH of 5.0±0.3 and a solids content of 14.0±0.3 percent.

EXAMPLE X

A high solids sizing composition was prepared by adding water to a mix tank with 10 ml of acetic acid and agitated slowly while adding 709.2 grams (1.2 weight percent) of A-174. An amount of 139.8 grams (0.2 weight percent) of unhydrolyzed A-1100 was added to 17,160 grams (14.9 weight percent) of epoxidized polyvinyl acetate copolymer (RESYN 1971) in a pre-mix tank. An amount of 343.7 grams (0.3 weight percent) of Emery 6760 lubricant was diluted in hot water in a pre-mix tank. An amount of 2,283 grams (2.0 weight percent) of vinyl acetate-ethylene copolymer (AIRCOFLEX-X-510) was added to the mix tank containing the hydrolyzed A-174. The mixture of A-1100 and epoxidized polyvinyl acetate copolymer and the diluted Emery lubricant were added to the mix tank and mixed. The resulting solution was diluted to 15 gallons (56.775 liters) and the pH adjusted to 5.0±0.2 with acetic acid. The percent solids of the sizing composition were between 18 and 20 percent.

In the foregoing examples the weight percent is weight percent of the aqueous sizing composition unless otherwise specified.

The sizing composition of Example I through X were used to treat glass fibers to produce K-37 glass fiber strand. This involved drawing the glass fibers from a bushing after which they were treated with the sizing composition during this formation step. The individual sized fibers were gathered into strands and collected on a forming tube mounted on a collet which was rotating at approximately from 3400 to 4500 revolutions per minute.

The glass fibers strand treated with the sizing composition in Examples II and V-X had an amount of the sizing composition on the strand of 2.0±0.15 percent by weight for Example II and 2.1±0.15 percent by weight for Examples V-X where percent by weight is of the dried size composition on the strand based on the total weight of the glass and the dried residue of the sizing composition.

The forming packages of glass fiber strands treated with the sizing compositions of Example I through X were dried in an oven at 130° C. for 11 hours. A number of the packages with the same sizing composition were mounted on a creel and braided into a roving and collected on a rotating spindle to form a roving ball.

A number of ends from each one of eight roving balls having the dried residue of sizing composition of Examples I through IV and V, VII, VIII and IX were threaded into a chopper of a sheet molding compound machine. The different rovings were fed at different times to produce eight different HMC ® compounds each having one of the eight different glass fiber strands chopped into ¼ inch lengths.

HMC ® composites, produced on conventional SMC compounding equipment, offer much higher strengths than does SMC. These higher strengths are achieved by obtaining glass contents of 65%. In essence the calcium carbonate normally used as a filler and flow inducer in SMC has been replaced with fiber glass.

HMC ® composite molding techniques are very similar to those used with SMC. Recommended minimum die coverage is 30% but good structural strengths which are isotropic in nature are best achieved by covering at least 75% of the mold surface. When mold coverage is at this higher percentage, it is possible to mold at pressures as low as 300 psi.

The molded panels of HMC ® composite were made by feeding the various rovings with sizing compositions of Examples 5, 7, 8 or 9 into the sheet molding compound machine and the chopped glass roving was impregnated with a catalyzed polyester resin, and after a maturation period, was compression molded at 149° C. (300° F.) under 4.83 megapascals (700 psi) pressure and at 70% charge of the mold surface to give a thickness of 0.25 cm (0.1 inch) for mechanical properties testing.

In producing the HMC ® molding compounds, the matrix polymers used were three polyester resins that are based on phthalic anhydride, maleic anhydride, adipic acid and various glycols and, in addition, some low profile additives. In addition, styrene monomer was also used. These resins were synthesized by the Coatings and Resins (C & R) division of PPG Industries, Inc., Pittsburgh, Pennsylvania. Basic differences in these resins are:

1. Selectron ® resin 50322—is a mixture of rigid and flexible polyesters;
2. Selectron ® resin Phase II LP 2252—a mixture of rigid polyester and low profile additive;
3. Allotron SR331—a mixture of rigid polyester and low shrink additive.

An addition to the glass fiber strands that are K-37 strands made with the sizing compositions of Example I through X, K-37/2 glass fiber strands available from PPG Industries Fiber Glass Division under the trade designation "518 roving" were also used to produce a HMC molding compound.

The molded panels of HMC ® composite were tested for in-plane shear strength according to ASTMD-695, flexural strength, both dry and wet according to ASTMD-790, flexural modulus, both dry and wet according to D-790, and Sonntag fatigue test according to ASTMD-671.

The test for wet-out was performed by a visual observation observed as soon as possible after wrap-up of the HMC® compound into square foot samples for determination of sheet weight. The wet-out is measured by rolling out the HMC® compound on a table and all dry glass or excess paste is trimmed from the end of the sheet. Three sections, 12–18 inches long, are cut one after another from the compound. Each of these sections are stripped to delaminate the compound on a cross-sectional bias perpendicular to the sheet molding compound machine direction and across both test glass products. Any dry strands present appear at the center of the bias. The amount of wet-out is compared to visual standards using 5 percent gradients.

Results of the test are presented in Table I.

TABLE I

| Sample Composites Having the Designated Glass Fibers | Glass Content | TESTS Wet-Out | % Breakup | In Plane Shear Strength psi × 10³ | Flexural Strength psi × 10³ | Flexural Modulus psi × 10³ | Izod Impact Ft/Lb/In |
|---|---|---|---|---|---|---|---|
| (1) 518 Commercial Roving | 67 | 90 | 95 | 4.0 | 46.5 | 1.97 | 20.1 |
|  | 68 | 85 | 95 |  |  |  |  |
|  | 65 | 90 | 95 |  |  |  |  |
| (2) Glass Fibers with Sizing Comp of Example I | 64 | 90 | 95 | 3.4 | 53.5 | 2.4 | 22. |
|  | 66 | 100 | 100 |  |  |  |  |
| (3) Glass Fibers with Sizing Comp of Example III | 67 | 100 | 100 |  |  |  |  |
| (4) Glass Fibers with Sizing Comp of Example IV | 67 | 100 | 100 | 4.0 | 58.3 | 2.4 | 26.8 |
| (5) Glass Fibers with Size of Example VI (Dry sample) | 65.4 | 100 | — | 2.7 | 53.5 | 2.3 | 25.4 |
| (6) Glass Fibers with Size of Example VII (Dry sample) | 64.5 | 100 | — | 2.4 | 55.4 | 2.1 | 23.1 |
| (7) Glass Fibers with Size of Example VIII (Dry sample) | 48.6 | 85 | — | 3.7 | 51 | 2.2 | 23 |
| (8) Glass Fibers with Size of Example IX (Dry sample) | 49.1 | 85 | — | 3.5 | 48.2 | 2.1 | 24.1 |

From Table II it is seen that the use of epoxidized polyvinylacetate copolymer improves the wet-out of the glass fiber roving on the sheet molding compound machine in HMC® composites without adversely affecting the mechanical properties. The results of example 4 in Table I where the sizing composition of example 4 was used shows the best wet-out performance. The sizing composition of example 4 also showed the highest impact strength among all the panels for which test results are shown in Table II. Sample 2 in Table II utilizes the sizing composition of example 1 wherein an additional film former compatabilizing agent was not used with the epoxidized polyvinyl acetate copolymer film former. It is seen that the wet-out performance of this composite was still better than the control panel utilizing the commercial 518 roving. Also the other samples show good mechanical properties for the molded composite.

The foregoing has described a sizing composition for use in a process of producing sized glass fiber strands that have improved wet-out performance when used for reinforcing polymers such as unsaturated polyester resins, vinylesters and epoxies that have improved mechanical properties. The sizing composition needs only one or more organo silanes, acetic acid, water and 3 to about 20 weight percent of the epoxidized polar thermoplastic copolymer, and one or more lubricants to accomplish the task of improving the wet-out performance and solubility of the sized glass fibers in the polymer matrix while retaining or improving mechanical properties of the glass fiber reinforced polymer. In addition, the sizing composition may have one or more compatibilizing agents in an amount of less than 20 weight percent of the film former.

We claim:

1. An aqueous sizing composition for glass fibers that is substantially soluble in polymeric materials the glass fibers are to reinforce, comprising:
   (a) a predominant amount of the solids of the composition being an epoxidized polar thermoplastic copolymer having 3 to about 12 parts of epoxy per 100 parts of copolymer, where the comonomer is selected from vinyl acetate, acrylate and polyurethane condensate monomer, and where the polymer has a Tg in the range of ambient temperatures to about 70° C.;
   (b) one or more compatibilizing agents selected from unsaturated polyester polymer, polyvinylacetate homopolymer, or vinyl acetate-ethylene copolymer, in an amount of less than about 20 weight percent of the total amount of film former in the sizing composition;
   (c) one or more organo silane coupling agents;
   (d) one or more lubricants,
   (e) an amount of water sufficient to make the percent 2. Aqueous sizing composition of claim 1 wherein the organo-silane coupling agent present is a silane having a free radical polymerizable reactive organo moiety in an amount of about 0.1 to about 5 weight percent of the aqueous sizing composition.

3. Aqueous sizing composition of claim 1 wherein the organo-silane coupling agents present are a silane having a free radical polymerizable reactive organo moiety and an aminofunctional organo silane.

4. Aqueous sizing composition of claim 1 wherein the one or more lubricants are selected from cationic, nonionic and anionic lubricants.

5. Aqueous sizing composition of claim 1 wherein the one or more lubricants are selected from amidated polyamine lubricants and alkylimidazoline derivative lubricants.

6. Aqueous sizing composition of claim 1 wherein the percent by weight of solids is in the range of about 18 to about 25.

7. The aqueous sizing composition of claim 1 wherein the expoxidized polar thermoplastic copolymer is epoxidized polyvinylacetate copolymer.

8. In a process of preparing sized glass fiber roving for use in preparing reinforced polymeric materials, the Improvement comprising:
  (a) treating the glass fibers during their formation with an aqueous sizing composition, comprising:
    (1) a major amount of the solids of the sizing composition in an epoxidized polar thermoplastic copolymer having 3 to about 12 parts of epoxy per 100 parts of the copolymer, where the comonomer is selected from vinyl acetate, acrylate, and polyurethane condensate monomer, where the copolymer has a Tg in the range of ambient temperatures to about 70° C.,
    (2) one or more compatibilizing agents selected from unsaturated polyester polymers, polyvinylacetate homopolymer, or vinyl acetate-ethylene copolymers, in an amount of less than 20 weight percent of the film former,
    (3) one or more organo silane coupling agents,
    (4) one or more nonionic, cationic or anionic lubricants, and
    (5) an amount of water sufficient to make the percent solids of the sizing composition in the range of about 2 to about 30 weight percent,
  (b) gathering the treated glass fibers into one or more treated glass fiber strands,
  (c) drying the treated glass fiber strand or strands at a temperature above about 100° C. for more than one hour to remove most of the moisture from the strand or strands,
  (d) gathering a plurality of dried glass fiber strands into a roving.

9. One or more glass fiber strands having the dried residue of the sizing composition of claim 1.

10. Glass fiber reinforced polymeric articles having the glass fiber strands of claim 9.

11. A sizing composition for treating glass fibers having a vinyl-containing organo functional silane, epoxidized polyvinylacetate copolymer present in a major amount of the solids of the aqueous sizing composition and in the range of 3 to about 20 weight percent of the aqueous sizing composition, the copolymer having about 3 to about 12 parts of epoxy per 100 parts of vinylacetate, and vinylacetate-ethylene copolymer present in an amount of water to give a solids content for the sizing composition in the range of 2 to about 30 weight percent.

12. The composition according to claim 11 having an unsaturated polyester resin compatabilizing agent present in an amount less than 10 weight percent of the amount of film former in the aqueous sizing composition.

13. Sized glass fiber strands have the dried residue of the aqueous sizing composition of claim 11.

14. Glass fiber reinforced polymer having the sized glass fiber strands of claim 11.

15. The article according to claim 14 wherein the reinforced polymer is selected from unsaturated polyesters, vinyl esters and epoxy polymers.

16. A process for preparing an aqueous sizing composition for treating glass fibers for use as reinforcement in polymeric materials, comprising:
  (a) combining an organo silane coupling agent having the free radical polymerizable organo moiety with water and acetic acid,
  (b) combining an epoxidized polyvinylacetate copolymer present in a major amount of the solids of the aqueous sizing composition with an unhydrolyzed or partially hydrolyzed aminofunctional organo silane coupling agent present in an amount in the range of about 0.1 to about 5 weight percent of the aqueous sizing composition,
  (c) adding vinyl acetate-ethylene copolymer to the organo silane mixture of step a),
  (d) adding the mixture of step c) to the water diluted mixture of step b),
  (e) adding water diluted amidated polyamine lubricant to the mixture of step d),
  (f) diluting the mixture of step e) with water to obtain the desired volume.

17. Sizing composition produced by the method of claim 16.

* * * * *

UNITED STATES PATENT AND TRADEMARK OFFICE
CERTIFICATE OF CORRECTION

PATENT NO. : 4,341,877
DATED : July 27, 1982
INVENTOR(S) : Balbhadra Das and Billie D. Tucker It is certified that error appears in the above-identified patent and that said Letters Patent are hereby corrected as shown below:

Claim 1, column 14, line 58, subparagraph e), should read --an amount of water sufficient to make the percent solids of the sizing composition in the range of about 2 to about 30 weight percent.--

Signed and Sealed this

*Seventh* Day of *December 1982*

[SEAL]

*Attest:*

GERALD J. MOSSINGHOFF

*Attesting Officer*     *Commissioner of Patents and Trademarks*